UNITED STATES PATENT OFFICE.

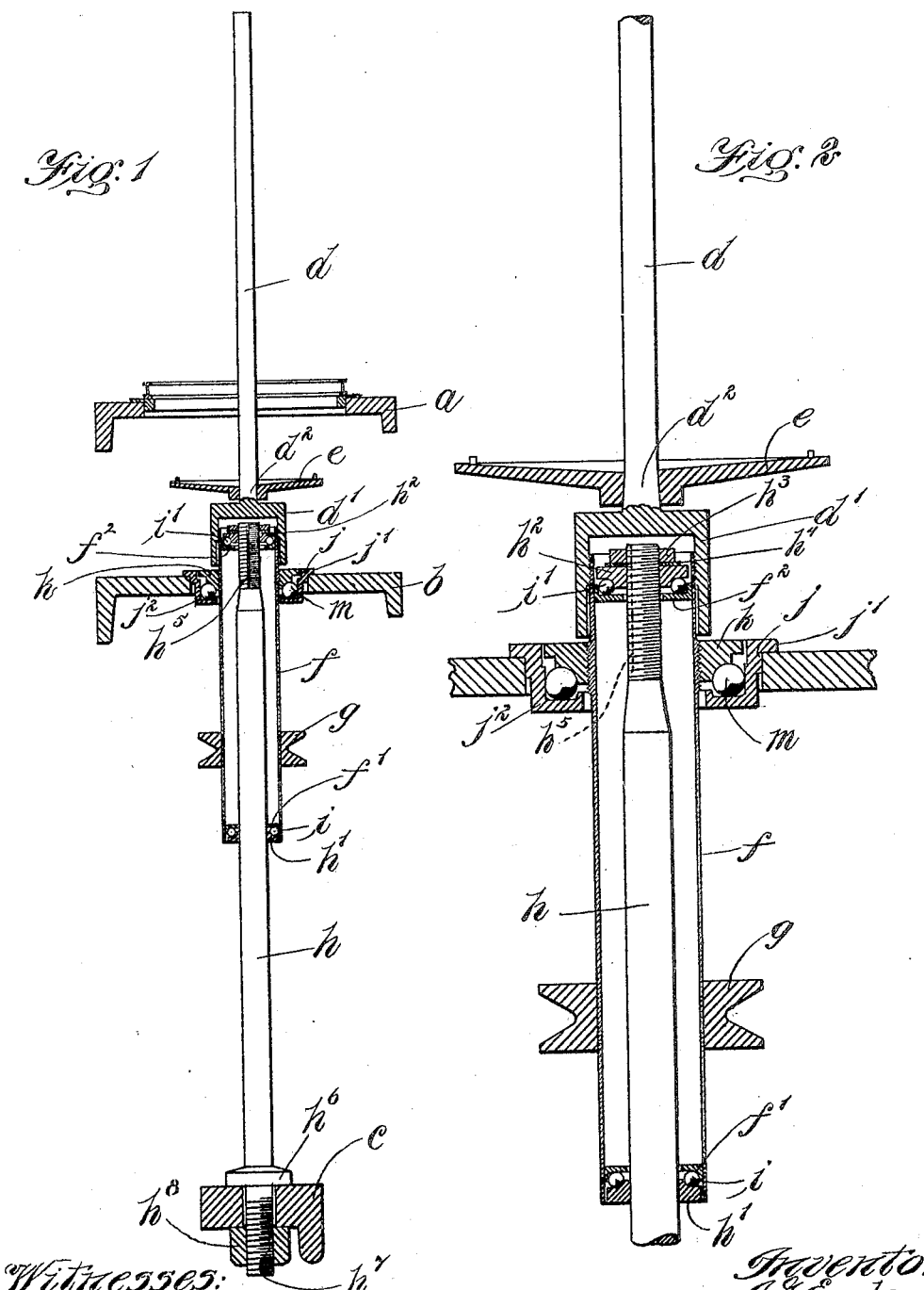

JAMES G. EARLE, OF DEDHAM, MASSACHUSETTS.

SPINDLE.

No. 818,082.   Specification of Letters Patent.   Patented April 17, 1906.

Application filed April 27, 1905. Serial No. 257,676.

*To all whom it may concern:*

Be it known that I, JAMES G. EARLE, of Dedham, in the county of Norfolk and State of Massachusetts, have invented certain new and useful Improvements in Spindles, of which the following is a specification.

This invention has relation to spindles, and has for its object to provide therein certain improvements, which are illustrated upon the accompanying drawings, described in the following specification, and set forth in the appended claims.

Referring to said drawings, Figure 1 represents in section a spindle embodying the invention. Fig. 2 represents an enlarged section through the same.

The usual ring-rail with the ring thereon is indicated at $a$ and the spindle-rail at $b$. In addition I employ what may be termed a "step-rail" $c$ for a purpose to be described.

The blade or member $d$ has an inverted cup $d'$ on its lower end and is tapered at $d^2$ to receive a spool or bobbin holder $e$ of any ordinary or suitable construction. The cup $d'$ is interiorly threaded to screw upon the upper end of a hollow cylinder or sleeve $f$, which is mounted to rotate freely and to which is attached the band-driven whirl $g$. It will be noted that the whirl is located below the spindle-rail.

The sleeve $f$ and the member $d$ constitute a two-part element which is employed in lieu of the ordinary spindle-blade and in which the parts are separable, so that members $d$ of different lengths or diameters may be employed. The sleeve $f$ is journaled upon the upstanding rod or stem $h$, which is supported by the step-rail $c$. Said rod or stem projects upward through an aperture in the rail $b$ and is provided at two separated points with cones $h'$ $h^2$, respectively. The cone $h'$ has a friction-tight fit upon the rod and is in operative relation to a race $f'$ at the lower end of the sleeve, so that balls $i$ may be interposed between them. The cone $h^2$ is screwed upon the upper reduced and threaded end of the rod and is held or locked after adjustment by a lock-nut $h^3$ and a washer $h^4$, which has a lug extending into a slot $h^5$ in said rod. Coacting with said cone is a race $f^2$, inserted in the upper end of the sleeve $f$, and between the cone and the race are the antifriction-balls $i'$.

The lower end of the rod or stem $h$ has a base $h^6$, resting upon the step-rail, and a threaded portion $h^7$ extending through an aperture in said rail to receive a lock-nut $h^8$. The axes of the rod $h$ and the blade $d$ coincide.

The sleeve $f$ in addition to being journaled on the rod or stem is journaled upon the spindle-rail. To this end the rail $b$ has an aperture to receive a cup $j$, which has a flange $j'$ overlapping the surface of the rail, as shown. The cup $j$ is formed with a race $j^2$, while upon the sleeve $f$ is screwed a cone $k$, so that balls $m$ may be placed between them. This antifriction-bearing serves to support the weight of the spindle-blade, the sleeve, and the whirl, whereas the rod or stem $h$ holds said parts against lateral or gyratory movement.

The invention possesses numerous advantages which will be apparent to those skilled in the art to which it relates. Among these advantages may be noted the steadiness and evenness of rotation and the removability of the blade with its inverted cup-shaped base or end.

Having thus explained the nature of the invention and described a way of constructing and using the same, although without attempting to set forth all of the forms in which it may be made or all of the modes of its use, I declare that what I claim is—

1. In a spindle, a bearing adapted to be supported by the spindle-rail, a rotatable member mounted in said bearing, a blade supported and rotated by said member, a whirl on said member below the spindle-rail, and an independently-supported stem on which said rotatable member is journaled to hold it against lateral or gyratory vibration.

2. The combination with a step-rail and a spindle-rail, of a rod or stem on the step-rail, a bearing on the spindle-rail, and a hollow bobbin-supporting member journaled in said bearing and on said rod or stem.

3. In a spindle, the combination of a rod or stem, a hollow cylinder, said rod or stem and said cylinder being provided with complemental cones and races, balls interposed between said cones and races, and a blade attached to said hollow cylinder.

4. In a spindle, the combination of a rod or stem, a hollow cylinder, said rod or stem and said cylinder being provided with complemental cones and races, balls interposed between said cones and races, a blade attached to said hollow cylinder, a cup adapted for attachment to a rail and having a race, an external cone on said cylinder and balls between said last-mentioned cone and race.

In testimony whereof I have affixed my signature in presence of two witnesses.

JAMES G. EARLE.

Witnesses:
M. B. MAY,
C. C. STECHER.